US011366919B2

(12) United States Patent
Botdorf et al.

(10) Patent No.: US 11,366,919 B2
(45) Date of Patent: Jun. 21, 2022

(54) INTEGRATED MODULAR REINFORCED CASE WITH A FLOATING PROTECTIVE CHAMBER

(71) Applicants: John C. Botdorf, Castle Rock, CO (US); David Mudrick, Prescott, AZ (US); Bernard J. Perini, Bethpage, NY (US)

(72) Inventors: John C. Botdorf, Castle Rock, CO (US); David Mudrick, Prescott, AZ (US); Bernard J. Perini, Bethpage, NY (US)

(*) Notice: Subject to any disclaimer, the term of this patent is extended or adjusted under 35 U.S.C. 154(b) by 0 days.

(21) Appl. No.: 17/292,818

(22) PCT Filed: Nov. 13, 2019

(86) PCT No.: PCT/US2019/061336
§ 371 (c)(1),
(2) Date: May 11, 2021

(87) PCT Pub. No.: WO2020/102461
PCT Pub. Date: May 22, 2020

(65) Prior Publication Data
US 2021/0267334 A1    Sep. 2, 2021

Related U.S. Application Data

(60) Provisional application No. 62/760,208, filed on Nov. 13, 2018.

(51) Int. Cl.
*A45C 13/02* (2006.01)
*G06F 21/62* (2013.01)
(Continued)

(52) U.S. Cl.
CPC ........ *G06F 21/6218* (2013.01); *A45C 13/005* (2013.01); *A45C 13/18* (2013.01);
(Continued)

(58) Field of Classification Search
CPC . A45C 2011/003; A45C 13/005; A45C 13/36; A45C 2013/025; B65D 81/05;
(Continued)

(56) References Cited

U.S. PATENT DOCUMENTS 4,013,170 A * 3/1977 Hutterer ................. B65D 81/07
206/521
5,924,574 A * 7/1999 Ku ....................... B65D 81/052
206/583
(Continued)

FOREIGN PATENT DOCUMENTS

WO    2018078468 A1    5/2018

OTHER PUBLICATIONS

International Search Report and Written Opinion dated Jan. 14, 2020, 14 pages.

*Primary Examiner* — Steven A. Reynolds
(74) *Attorney, Agent, or Firm* — Berg Hill Greenleaf & Ruscitti LLP

(57) ABSTRACT

The invention relates to a ruggedized integrated modular reinforced case having, in one preferred embodiment, a floating protective chamber for safely transporting a laptop computer, as well as other valuable, or fragile objects.

12 Claims, 14 Drawing Sheets

(51) Int. Cl.
*A45C 13/00* (2006.01)
*A45C 13/18* (2006.01)
*A45C 13/36* (2006.01)
*B65D 81/07* (2006.01)
*B65D 81/107* (2006.01)
*G06F 1/16* (2006.01)
*A45C 11/00* (2006.01)

(52) U.S. Cl.
CPC .............. *A45C 13/36* (2013.01); *B65D 81/07* (2013.01); *B65D 81/107* (2013.01); *G06F 1/1628* (2013.01); *G06F 1/1656* (2013.01); *G06F 1/1658* (2013.01); *A45C 2011/003* (2013.01); *A45C 2013/025* (2013.01); *G06F 2221/2111* (2013.01)

(58) Field of Classification Search
CPC ..... B65D 81/07; B65D 81/107; G06F 1/1628; G06F 1/1656; G06F 21/6218; G06F 2221/2111
USPC .................................................. 206/583, 320
See application file for complete search history.

(56) References Cited

U.S. PATENT DOCUMENTS

| | | | |
|---|---|---|---|
| 6,349,825 B1 * | 2/2002 | Swinger | A45F 3/02 |
| | | | 190/102 |
| 7,448,495 B2 * | 11/2008 | Sadow | A45C 13/02 |
| | | | 206/320 |
| 7,516,597 B1 | 4/2009 | Roose | |
| 8,662,269 B2 * | 3/2014 | Shor | A45C 3/02 |
| | | | 190/109 |
| 2005/0284791 A1 | 12/2005 | Sadow | |
| 2013/0233757 A1 | 9/2013 | Fileni | |
| 2013/0241381 A1 * | 9/2013 | Hynecek | H05K 5/0217 |
| | | | 312/240 |

* cited by examiner

INTEGRATED MODULAR REINFORCED CASE WITH A FLOATING PROTECTIVE CHAMBER

CROSS REFERENCE TO RELATED APPLICATION

This application is a national stage application under 35 U.S.C. 371 of PCT Application No. PCT/US2019/061336 having an international filing date of Nov. 13, 2019, which designated the United States, which PCT application claimed the benefit of U.S. Application Ser. No. 62/760,208, filed Nov. 13, 2018, both of which are incorporated by reference in their entirety.#

TECHNICAL FIELD

The invention relates to a ruggedized integrated modular reinforced case with a floating protective chamber for safely transporting a laptop computer, as well as other valuable or fragile objects.

BACKGROUND OF THE INVENTION

Over the years there has been extensive development of the technology for moving small items such as books, equipment, and the like. Bags and briefcases come in a wide variety of forms and are adapted for a wide range of purposes. For example, they can be in the form of simple briefcases which can range from soft leather or imitation leather in a rectangular configuration through to rigid carrying cases made of rigid plastic or leather incorporating rigid elements. Likewise, briefcases made of non-rigid materials are often made rigid with metal strips which give the brief case a hard edge and soft sides, and the like.

The transport and movement of electronic devices, such as laptops and the like, presents special logistical problems. One classic solution to this problem is the hard plastic case containing a foam plastic shock protector which has a plurality of compartments sculpted into it. The various items to be protected, such as the laptop and the like, are put into compartments which substantially match their shape and size. In recent years, one of the more typical applications for advanced luggage technology has been in connection with the movement of portable computers, such as laptop computers. In this regard, a great number of applications have arisen involving structures which provide for the portability of laptop computers.

The earliest structures for containing laptop computers consisted of conventional bags which were simply proportioned and scaled to the job of carrying a laptop computer. Recognizing the delicate nature of laptop computers, and the liquid crystal screens which they employ, which are perhaps the most delicate and likely to be damaged part of the computer, bag manufacturers quickly came to realize the special problems involved and began to work on the problem of providing for the safe transport of laptop computers. The first steps taken to address these issues involved the use of shock absorbing materials in the bags.

The materials which they used, which remain in use today, principally comprise foam plastic materials with a wide range of characteristics. Such materials are also used in a wide range of thicknesses, dependent upon the position of the particular shock absorbing member, its characteristics, and other structural features. The problem with such systems is that they will only work for a range of laptop computer sizes which are relatively limited. Moreover, such traditional systems are not robust and only provide minimal protection against shaking or other impact forces.

More advanced systems have involved the use of shock absorbing pads which are contained within fabric housings. These fabric housings are secured to the inside of the bag by a hook and eye, fabric adhesion system, such as that manufactured by the Velcro Corporation and sold under the trademark Velcro®. As may be apparent, the use of Velcro® fasteners allows the housings containing the shock absorbers to be moved to a variety of positions, thus enabling them to accommodate a wide range of sizes of laptop computers with a snug fit, presumably insuring better absorption of shocks due to various types of impact, such as falling, bumping during transport, and impacts due to placement on a hard surface such as a table. However, again, such traditional systems are not robust and only provide minimal protection against shock or other impact forces. Moreover, such traditional systems are not adaptable to additional types of fragile or valuable items, such as the transport of scientific equipment, valuable artwork, or other like items.

As such, there exists a need for an improved ruggedized carrying case that addresses the problems identified above. This modular improved ruggedized carrying case must be both practical and cost effective and be compatible with various types of travel arrangements from quick overnight trips to extended business related travel. Importantly, the system must employ non-traditional systems and configurations to provide multiple layers of protection, from hardbody construction, to improved shock absorbent material mechanisms as well as non-traditional floating chamber technology that may be employed singly or modularly in a synergistic fashion.

SUMMARY OF THE INVENTION

One aspect of the current invention may include an integrated modular reinforced case with a floating protective chamber. In one preferred embodiment, the invention may include a variety of ruggedizing features that may be mixed-and-matched in a modular fashion depending on the intended use of the case, or simply a user's desired level of security.

Another aspect of the current invention may include a ruggedize case that may be configured to safely secure and transport fragile items, such as laptops and the like. In certain embodiments, this ruggedize case may include a reinforced case formed by two opposing shells. Such shells may be configured with ruggedizing features such as reinforced distributive paneling and reinforced corner protectors to resist shock or impact forces.

Another aspect of the current invention may include an internal cage system that may be nested within a reinforced case and be separately accessible through an operable cage gate. In one embodiment, an internal cage may be a unitary component, while in alternative embodiments it may be a modular component thereby allowing it to be customized into a variety of shapes and configurations depending on what is intended to be secured within the internal cavity of the cage.

Another aspect of the current invention may include an internal buffering system that may be comprised of one or a plurality of shock absorbent surfaces that may be internally positioned within a reinforced case, internal cage or reinforced jacket. In one embodiment, a shock absorbent surface may be formed by a plurality of closely coordinated buffer cells that may be filled with air, or another elastic material, that may absorb and distribute a shock or impact force.

Another aspect of the invention is to integrate a data security system and protocol into the ruggedized case. In this embodiment, unauthorized access to the case may trigger an executable program that may erase, and/or encrypt select data that may be stored on an electronic device secured in the case.

Additional aspects of the invention may include one or more of the following preferred embodiments:

1. A reinforced case comprising:
   an outer shell composed of an upper outer shell coupled with a lower outer shell forming the upper and lower chamber of said reinforced case;
   a modular internal cage configured to be nested within said upper and lower chamber of said reinforced case;
   one or more shock absorbent surfaces configured to be secured to the internal surface of said modular internal cage forming a buffered internal cavity;
   at least one cage gate configured to allow access the internal portion of said modular internal cage;
   a floating chamber further comprising:
      a reinforced jacket configured to be positioned within said modular internal cage and secure a laptop or other fragile or valuable object;
      a jacket adapter coupled with a plurality of tractable supports configured to secure the reinforced jacket in a suspended position within said modular internal cage; and
      one or more jacket interfaces configured to secure one or more of said tractable supports;
      a jacket coupler secured to the terminal end of each of said plurality of tractable supports and configured to be secured to said modular internal cage, or said outer shell, or an internal catch.

2. The reinforced case of embodiment 1, and further comprising one or more reinforced panels configured to buttress said outer shell.

3. The reinforced case of embodiment 1, and further comprising one or more reinforcing surface inserts configured to ruggedize said outer shell.

4. The reinforced case of embodiment 1, wherein said upper outer shell and said lower outer shell are coupled by a reinforced hinge.

5. The reinforced case of embodiment 1, wherein said shock absorbent surface comprises a plurality of modular shock absorbent surface having a plurality of buffer cells configured to be secured to the internal surface of said modular internal cage forming a buffered internal cavity.

6. The reinforced case of embodiment 1, and further comprising a shell fastener configured to secure said upper outer shell coupled with said lower outer shell.

7. The reinforced case of embodiment 1, and further comprising a plurality of reinforced corner protectors.

8. The reinforced case of embodiment 1, and further comprising an internally positioned power source.

9. The reinforced case of embodiment 8, and further comprising an internally positioned GPS system operably linked to said power source.

10. The reinforced case of embodiment 9, wherein said GPS system operably linked to said power source is configured to be operably linked with a laptop and further configured to engage a data deletion signal directed to said laptop upon unauthorized access of the reinforced case.

11. The reinforced case of embodiment 1, wherein said jacket coupler comprises a quick release coupler.

12. A ruggedized carrying case comprising:
   an outer shell composed of an upper outer shell coupled with a lower outer shell forming the upper and lower chamber of said ruggedized carrying case;
   a modular internal cage configured to be nested within said upper and lower chamber of said ruggedized carrying case;
   one or more shock absorbent surfaces configured to be secured to the internal surface of the internal cage forming a buffered internal cavity; and
   at least one cage gate configured to allow access the internal portion of said modular internal cage.

13. The ruggedized carrying case of embodiment 11, and further comprising one or more reinforced panels configured to buttress said outer shell.

14. The ruggedized carrying case of embodiment 11, and further comprising one or more reinforcing surface inserts configured to ruggedize said outer shell.

15. The ruggedized carrying case of embodiment 11, wherein said upper outer shell and said lower outer shell are coupled by a reinforced hinge.

16. The ruggedized carrying case of embodiment 11, wherein said shock absorbent surface comprises a plurality of modular shock absorbent surface having a plurality of buffer cells configured to be secured to the internal surface of said modular internal cage forming a buffered internal cavity.

17. The ruggedized carrying case of embodiment 11, and further comprising a shell fastener configured to secure said upper outer shell coupled with said lower outer shell.

18. The ruggedized carrying case of embodiment 11, and further comprising a plurality of reinforced corner protectors.

19. The ruggedized carrying case of embodiment 11, and further comprising an internally positioned power source.

20. The ruggedized carrying case of embodiment 19, and further comprising an internally positioned GPS system operably linked to said power source.

21. The ruggedized carrying case of embodiment 20, wherein said GPS system operably linked to said power source is configured to be operably linked with a laptop and further configured to engage a data deletion signal directed to said laptop upon unauthorized access of the reinforced case.

22. A modular reinforced carrying case having a floating chamber comprising:
   an outer shell composed of an upper outer shell coupled with a lower outer shell forming the upper and lower chamber of said modular reinforced carrying case;
   a floating chamber further comprising:
      a reinforced jacket configured to be positioned within said upper and lower chamber of said modular reinforced carrying case and secure a laptop or other fragile or valuable object;
      a jacket adapter coupled with a plurality of tractable supports configured to secure the reinforced jacket in a suspended position within said modular internal cage;
      one or more jacket interface configured to secure one or more of said tractable supports; and
      a jacket coupler secured to the terminal end of each of said plurality of tractable supports and configured to be secured to an internal surface of said outer shell, or an internal catch.

23. The carrying case of embodiment 21 and further comprising one or more reinforced panels configured to buttress said outer shell.

24. The carrying case of embodiment 21 and further comprising one or more reinforcing surface inserts configured to ruggedize said outer shell.

25. The carrying case of embodiment 21 wherein said upper outer shell and said lower outer shell are coupled by a reinforced hinge.

26. The carrying case of embodiment 21 and further comprising one or more shock absorbent surfaces configured to be secured to the internal surface of said upper and lower chamber of said reinforced case forming a buffered internal cavity.

27. The carrying case of embodiment 26 wherein said one or more shock absorbent surfaces comprises a plurality of modular shock absorbent surfaces having a plurality of buffer cells.

28. The carrying case of embodiment 21 and further comprising a shell fastener configured to secure said upper outer shell coupled with said lower outer shell.

29. The carrying case of embodiment 21 and further comprising a plurality of reinforced corner protectors.

30. The carrying case of embodiment 21 and further comprising an internally positioned power source.

31. The carrying case of embodiment 30 and further comprising an internally positioned GPS system operably linked to said power source.

32. The carrying case of embodiment 31 wherein said GPS system operably linked to said power source is configured to be operably linked with a laptop and further configured to engage a data deletion signal directed to said laptop upon unauthorized access of the reinforced case.

33. The carrying case of embodiment 21 and further comprising a modular internal cage configured to be nested within said upper and lower chamber of said carrying case.

34. The carrying case of embodiment 33 wherein said modular internal cage comprises a modular internal cage having at least one cage gate configured to allow access to the internal portion of said modular internal cage.

Additional aspect of the invention may become clear to the reader from the disclosure and figures below.

BRIEF DESCRIPTION OF THE FIGURES

The novel aspects, features, and advantages of the present disclosure will be better understood from the following detailed descriptions taken in conjunction with the accompanying figures, all of which are given by way of illustration only, and are not limiting the presently disclosed embodiments, in which.

DETAILED DESCRIPTION OF THE INVENTION

Figure 1:
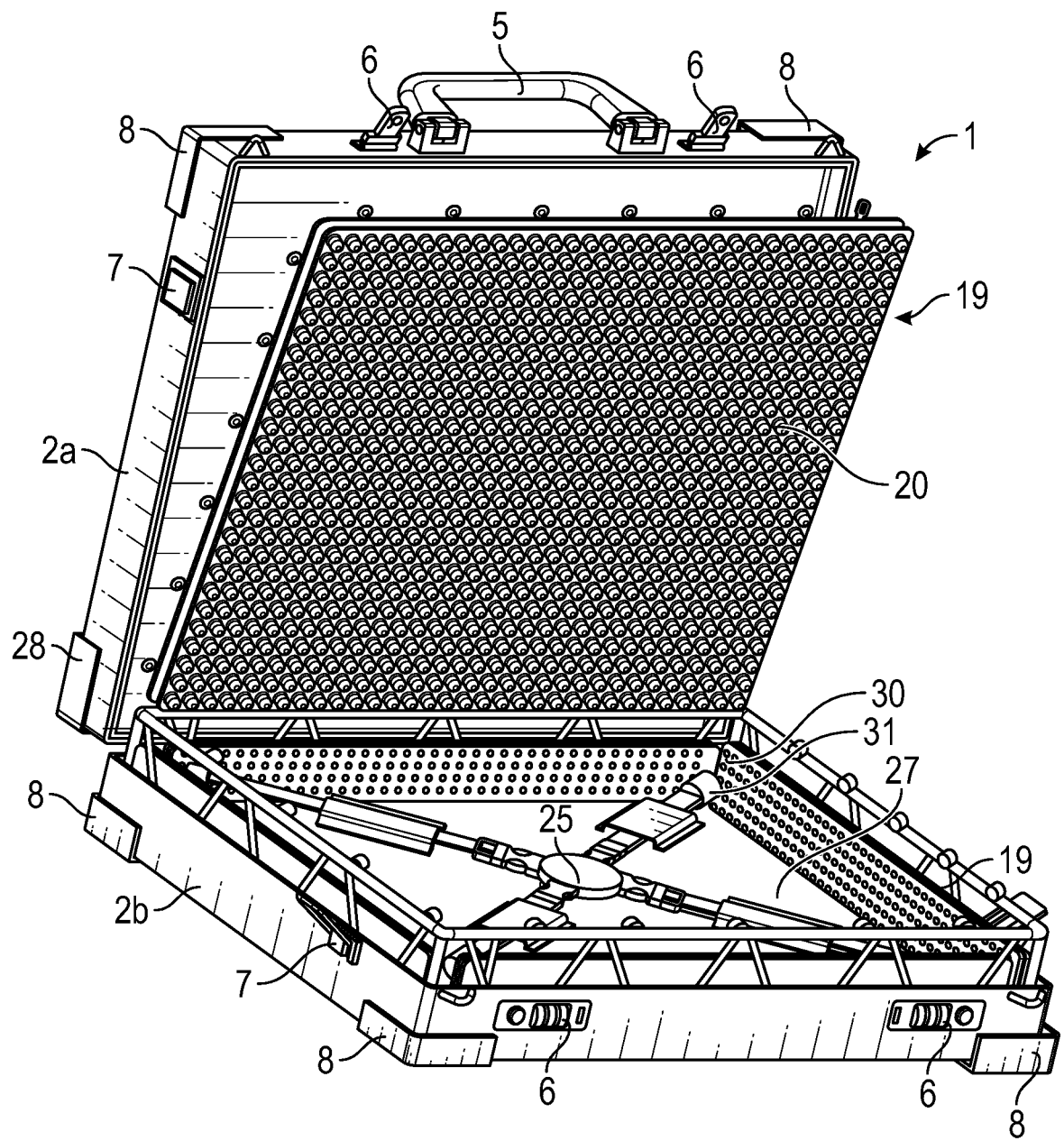
FIG. 1: is a perspective view of a reinforced case having an internally positioned cage and floating chamber apparatus in one embodiment thereof.

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

The inventive technology may include a reinforced case (1) that may further be configured to secure and protect electronic or other fragile items. In the preferred embodiment generally shown to FIGS. 2-6, the reinforced case (1) may be formed by an outer shell (2) having an upper outer shell (2a) and lower outer shell (2b) coupled by one or more reinforced hinges (4). In this embodiment, the upper outer shell (2a) and lower outer shell (2b) may be coupled through one or more reinforced hinges (4). As shown in FIGS. 2-5, in this embodiment, a plurality of reinforced hinges (4) may be externally positioned at spaced intervals along the interface between the upper and lower outer shells (2a, 2b). In this embodiment, the hinges may be positioned within a protective or reinforced hard covering that may form a barrier to protect the mechanical action of the hinge (4). In certain embodiments, this protective covering may be integral to the outer shell (2) components, or may be a distinct component that may be positioned separately over or around the hinge (4). In still alternative embodiments, a plurality of reinforced hinges (4) may be internally positioned at spaced intervals along the interface between the upper and lower outer shells (2a, 2b). In this embodiment, such internally placed hinges may allow the coupled interface between the upper and lower outer shells (2a, 2b) to be externally flush and thereby protected from external tampering or impact forces.

Figure 2:
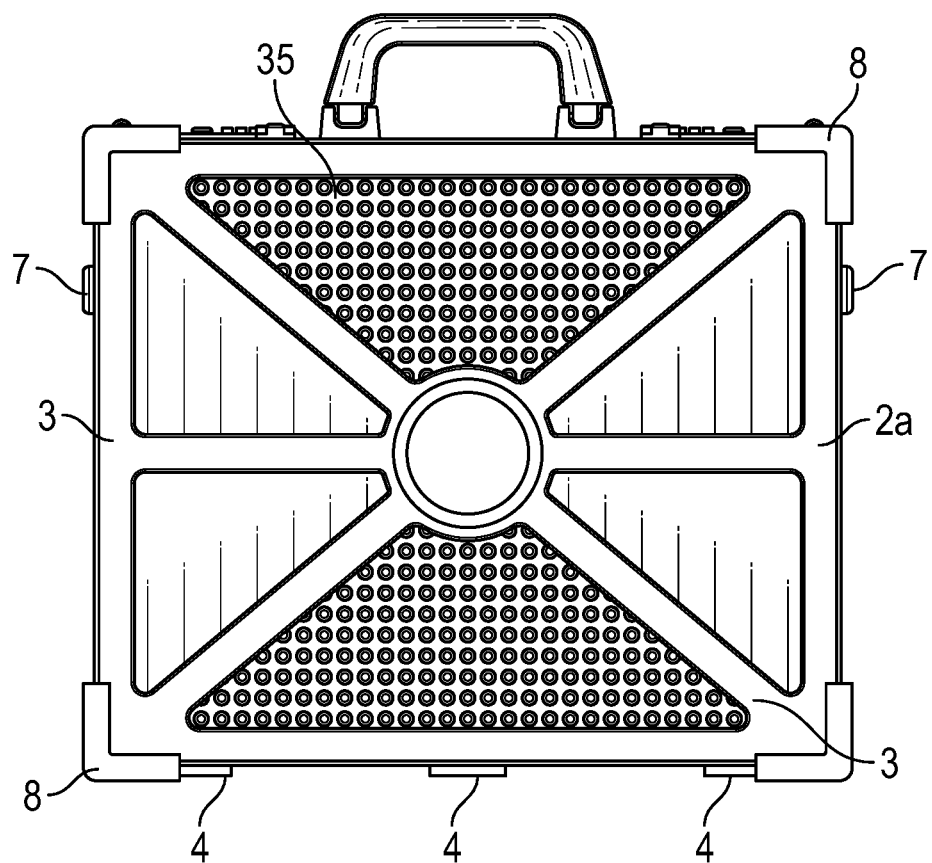
FIG. 2: is a front view of the outer shell of a reinforced case in one embodiment thereof.

As shown in FIG. 2, the reinforced hinges (4) may provide a rotatable coupling such that the upper and lower outer shells (2a, 2b) may be brought into contact forming a closed reinforced case (1) configuration. As further shown in FIG. 1, the reinforced hinges (4) may provide a rotatable coupling such that the upper and lower outer shells (2a, 2b) may be extended to form an open configuration. In this embodiment, the reinforced hinges (4) may be configured to be extended to a defined amount. For example, the hinges may be fully articulable such that the upper and lower outer shells (2a, 2b) may be extended to position at, or more than 180° degrees, while in alternative embodiments, such reinforced hinge (4) components may have limited articulation such that the upper and lower outer shells (2a, 2b) may be rotated to a range of up to or less than 90° degrees.

In certain additional embodiments, said hinge (4) components may be configured to extend or retract to a pre-determine configuration. For example, in one embodiment, one or more hinges (4) may be spring loaded such that when engaged it may extend or retract to a predetermined position. For example, when the upper or lower shells (2a, 2b) are in a closed configuration, they may be secured with a lock (6). While shown in the Figures as a combination lock, a variety of locking mechanisms may be contemplated within the scope of the invention. For example, the upper or lower shells (2a, 2b) may be secured with one or more locks (6) selected from the group consisting of: a slide lock, a snap lock, a twist lock, a quick release lock, a clamp lock, a key accessible lock, an electronic combination lock and the like. Additionally, the invention may include a single, as well as a plurality of locks that may be positioned on, or integrated with the upper outer shell (2a), lower outer shell (2b), or both.

In additional embodiments, a reinforced case (1) may include one or more shell fasteners (7). In the preferred embodiment shown in FIG. 1, a shell fastener (7) may include a quick release mechanism, such as a latch that may be configured to secure the upper and lower outer shells (2a, 2b) in a closed position. Again, a variety of shell fastener (7) components may be contemplated within the scope of the inventive technology. For example, in one embodiment, the invention may include a shell fastener (7) selected from the group consisting of: a slide fastener, a snap fastener, a twist fastener, a quick release fastener, a hook and eye fastener, a quick coupler, a band fastener, and a clamp fastener and the like.

Referring again to FIGS. 1-6, in this embodiment the reinforced case (1) may include a handle (5) component. While initially shown coupled with the upper outer shell (2a), this is an exemplary illustration only, as the handle may be positioned at multiple points on either the upper or lower shells (2a, 2b) or both. Additional components may include a plurality of strap holders (9) that may be configured to secure one or more carrying straps. In one preferred embodiment, a plurality of strap holder (9) components may be integrally formed into the upper and/or lower outer shells (2a, 2b) such that when the reinforced case (1) is placed in a closed position they form an integral aperture capable of securing a strap, preferably a carrying strap, having one or more quick release couplers on its terminal ends (not shown).

Figure 3:
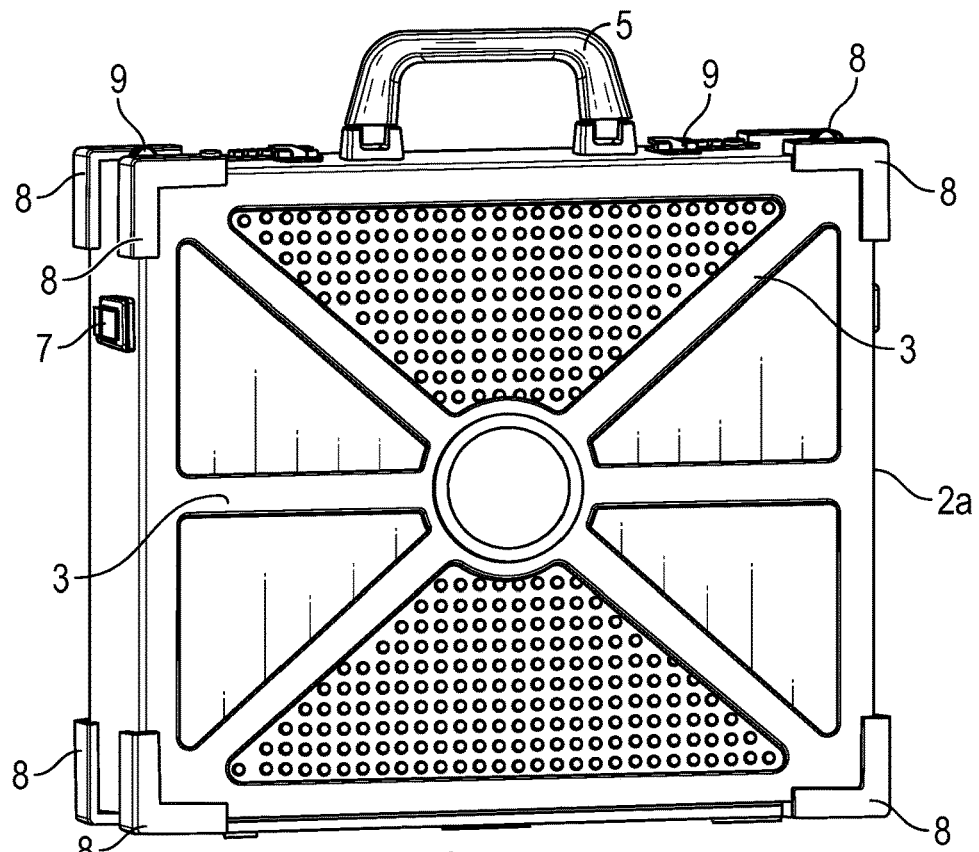
FIG. 3: is a front perspective view of the outer shell of a reinforced case in one embodiment thereof.
Figure 4:
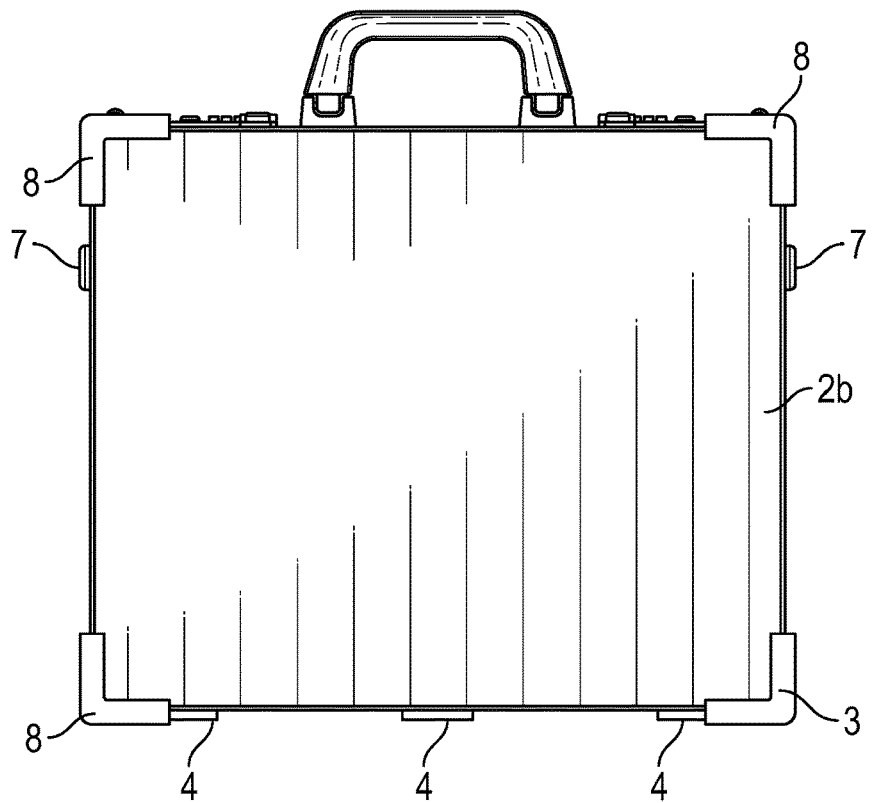
FIG. 4: is a back view of the outer shell of a reinforced case in one embodiment thereof.
Figure 5:
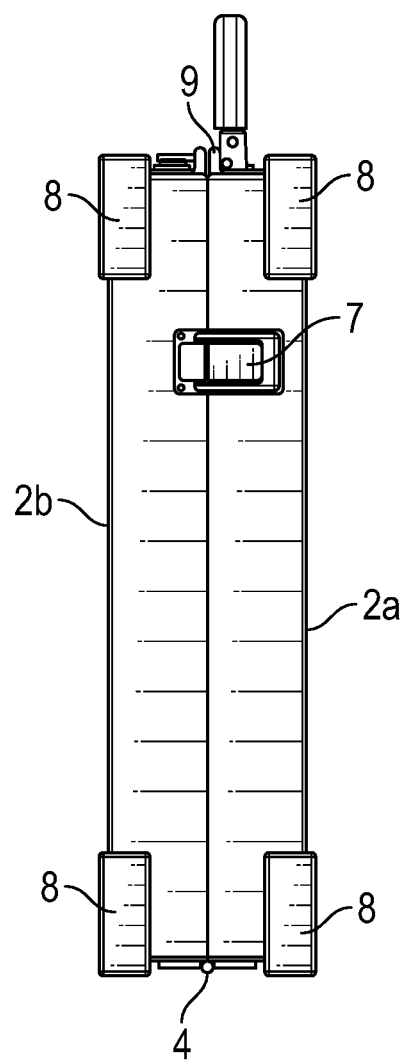
FIG. 5: is a side view of the outer shell of a reinforced case in one embodiment thereof.
Figure 6:
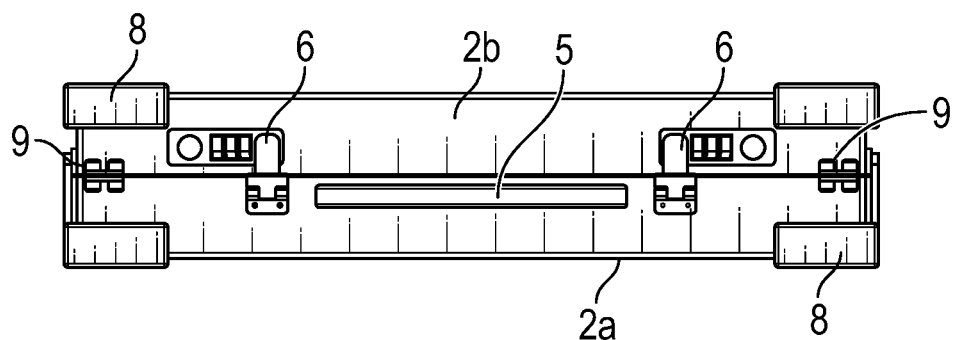
FIG. 6: is a top view of the outer shell of a reinforced case in one embodiment thereof.

The reinforced case (1) may include one or more ruggedizing elements. For example, as shown in FIG. 3, the reinforced case (1) may include a plurality of reinforced panels (3). In this embodiment, such panels may be constructed of a durable supporting material and further configured in a buttressed configuration. For example, in the preferred embodiment shown in the figures, a plurality of reinforced panels (3) may radiate out from a central support. In this buttressed configuration, a force applied to the reinforced case (1) may be distributed through the network of reinforced panels (3) providing improved impact and force application resistance. Additional embodiments may include one or more reinforced surfaces or surface inserts (25). For example, in one embodiment, the reinforced case (1) may be formed from a durable material, such as hard plastic, Kevlar®, or other composite material. In still further embodiments, reinforcing surface inserts (25) may be integrated with the reinforced case (1) providing additional strength and impact force distribution. While in the preferred embodiment shown such reinforcing surface inserts (25) are metal, additional materials may be included, again, such as hard plastic, Kevlar®, or various composite materials.

The reinforced case (1) may also include one or more reinforced corner protectors (8). As shown in FIGS. 1-6, in this embodiment a reinforced corner protector (8) may be positioned at the corner of the upper and lower outer shell (2a, 2b) components. In this embodiment, the reinforced corner protectors (8) may be integrally formed as part of the reinforced case (1) and may further be formed of a durable material that may allow any impact force to be more efficiently absorbed and/or distributed to the body of the reinforced case (1).

Again referring to FIG. 10, in this embodiment the internal compartment formed by the upper and lower shells (2a, 2b) may include a ruggedized surface (10, 11). Specifically, in one embodiment the upper and lower shells (2a, 2b) may include a layer of material configured to absorb impact shock, or other shaking forces. In this embodiment, the upper and lower shells (2a, 2b) may include a padded and/or reinforced surface, such as a foam, or rubberized padded surface. Additional embodiments may include on more modular ruggedized surfaces (10, 11) that may be individually removable and customizable in size, shape, and position. In an alternative embodiment, the upper and lower shells (2a, 2b) may include one or more shock absorbent surfaces (19) as generally described herein.

Figure 7:
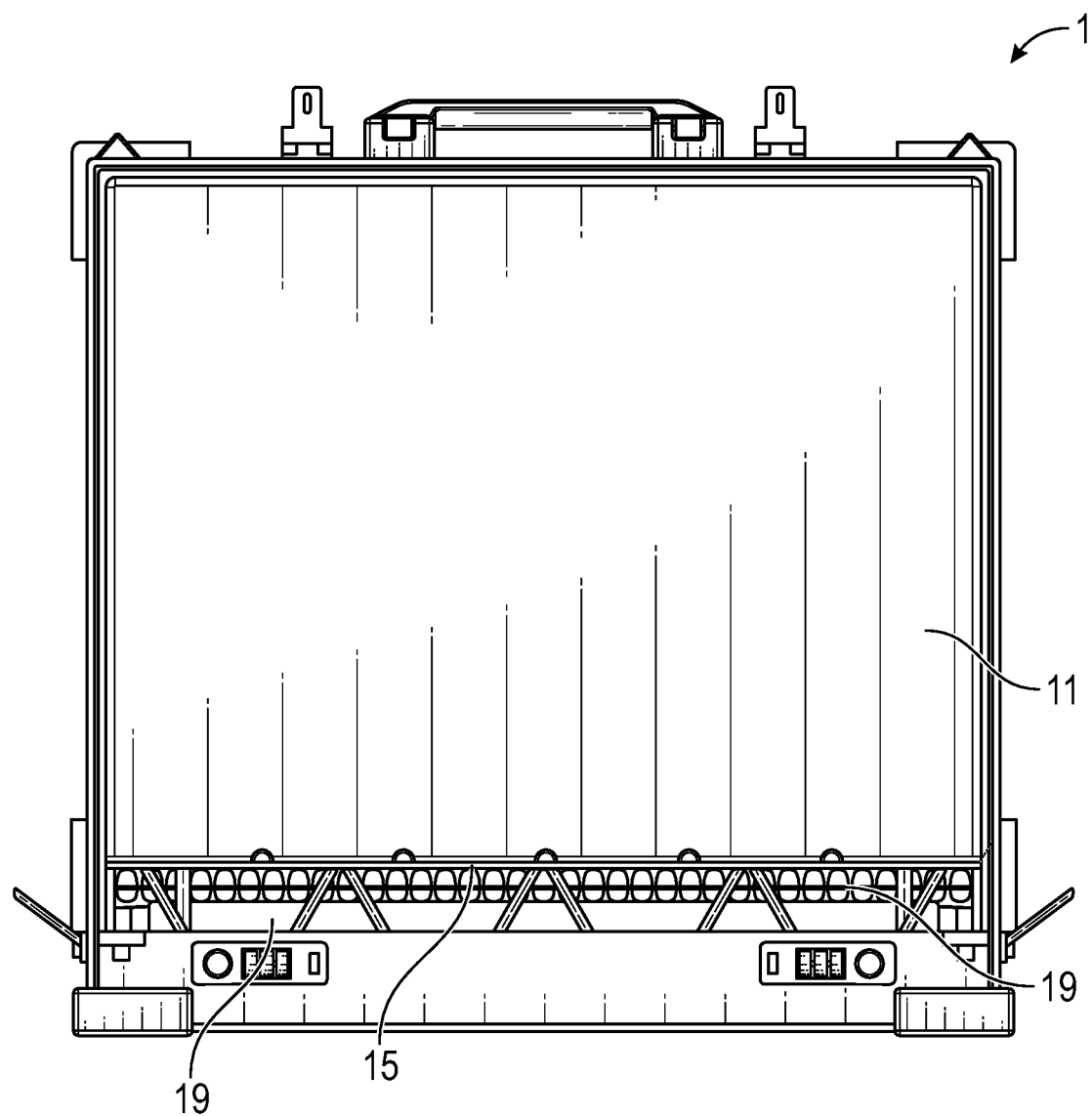
FIG. 7: is a front view of a reinforced case having an internally positioned cage in one embodiment thereof.
Figure 8:
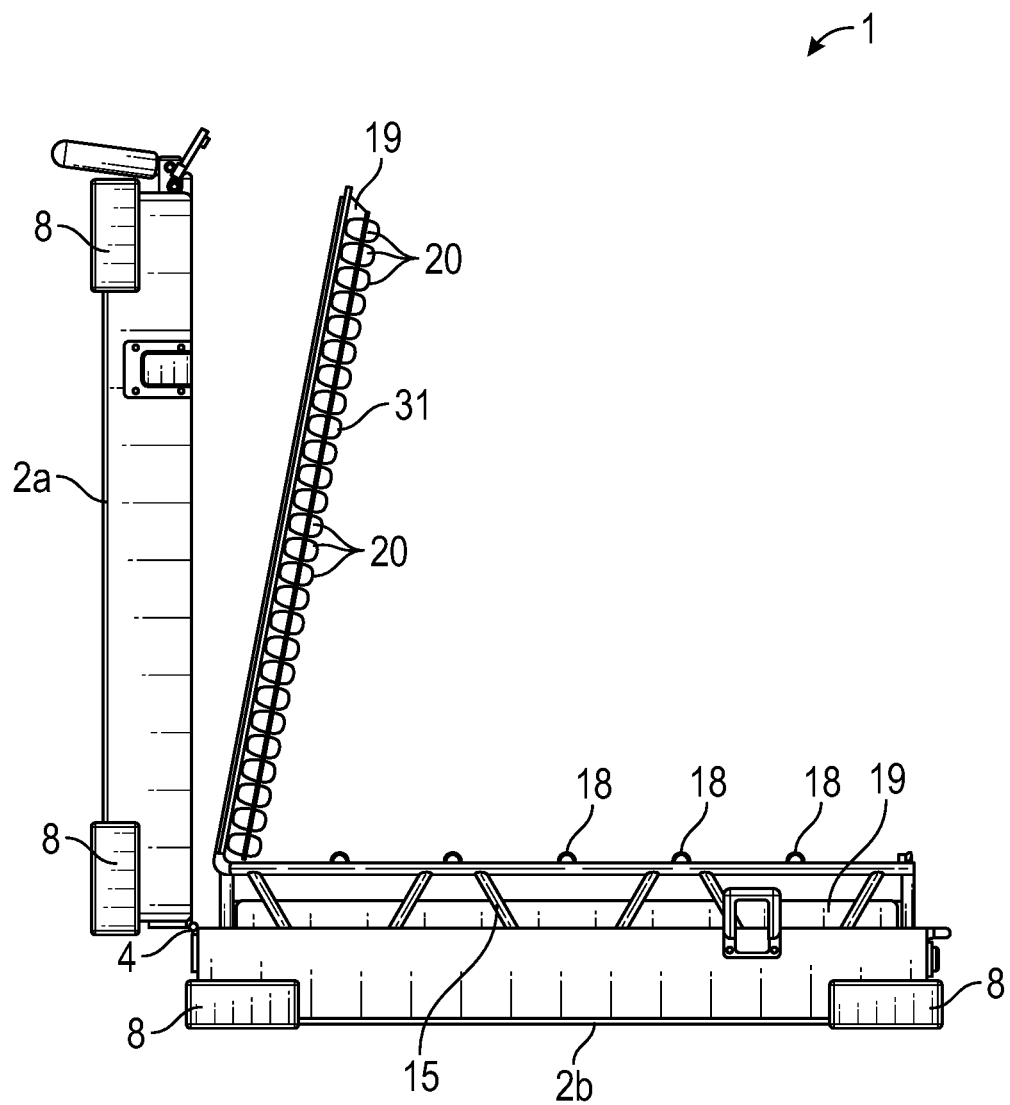
FIG. 8: is a side view of a reinforced case having an internally positioned cage with a cage gate in an open position and coordinated with a shock absorbent surface in one embodiment thereof.
Figure 9:
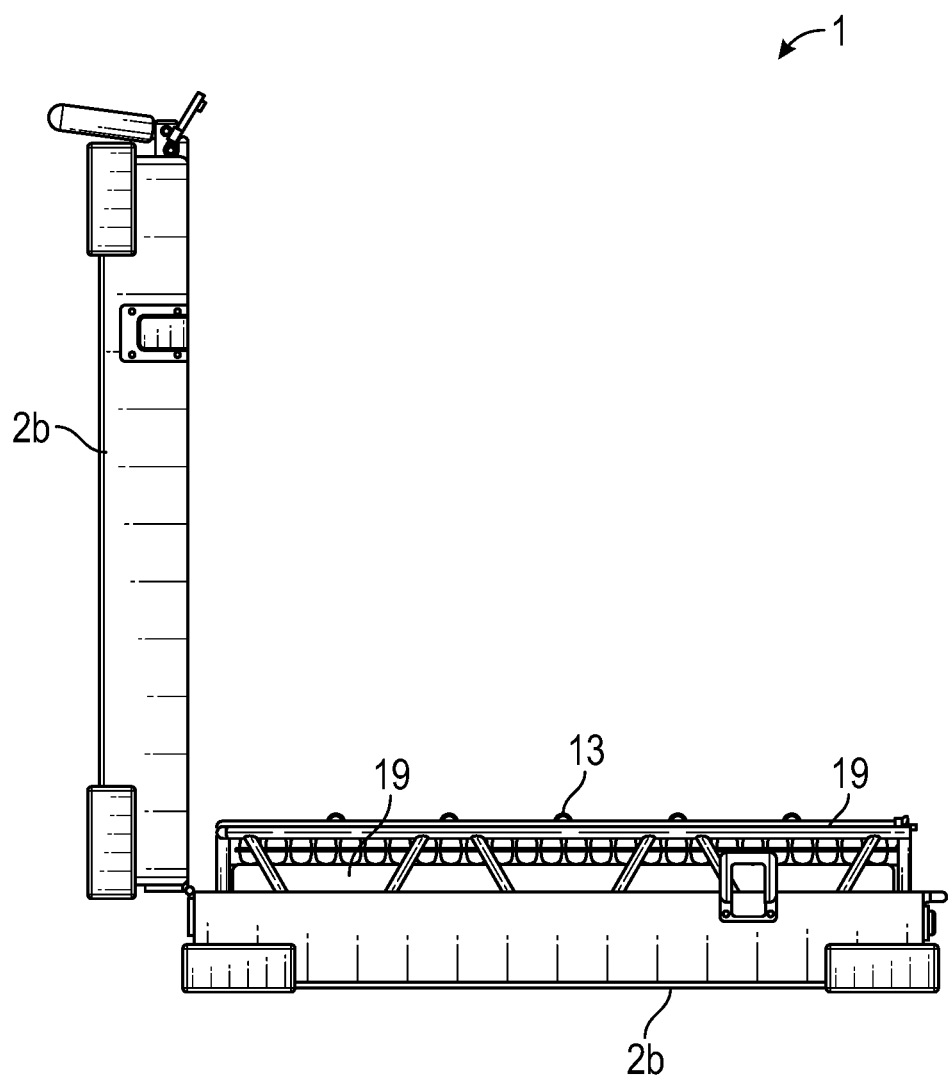
FIG. 9: is a side view of a reinforced case having an internally positioned cage with a cage gate in a closed position and coordinated with a shock absorbent surface in one embodiment thereof.
Figure 12:
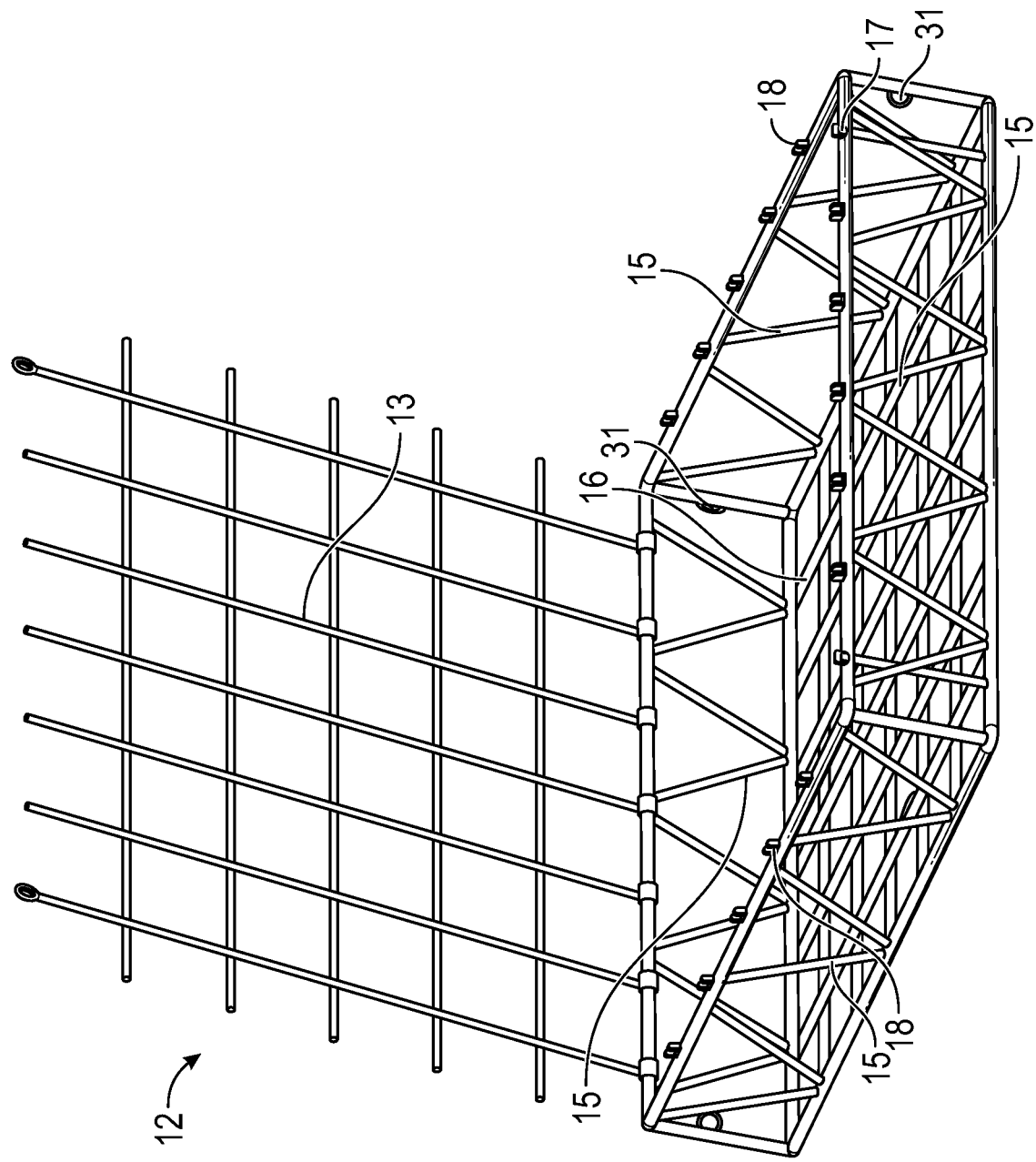
FIG. 12: is an isolated internal cage with a cage gate in an open position in one embodiment thereof.

Referring now to FIG. 12, the invention may include a modular internal cage (12). In one preferred embodiment, the internal cage (12) may include a metal cage apparatus being generally configured to the approximate dimensions of the item, or items intended to be secured therein. Again, as shown in FIG. 7, the internal cage (12) may be formed of metal or other rigid material, such as hard plastic or other composite material. Generally, the internal cage (12) may include a cage base (17) coupled with four opposing vertical cage wall (15) surfaces. Such surfaces may be integrally formed, or may be separately coupled through one or more transient coupler components, interlocking joints, or may be permanently affixed, such as through welded joints. As demonstrated in FIGS. 7-9, this internal cage may be further configured to be nested within the internal cavity of a reinforced case (1). For example, in this embodiment, the internal cage (12) may be positioned with in the lower chamber of the lower outer shell (12b). In this configuration, the internal cavity of the reinforced case (1) may be approximately flush with the internal side cage walls (15) of lower outer shell (12b) such that the internal cage (12) may be generally held in a static position within the reinforced case (1). In one preferred embodiment, the vertical side walls of the internal cage (12) may be configured with structurally reinforcing buttressing supports. Such buttressed configuration may allow an impact or other force applied to the internal cage (12) to be efficiently distributed throughout the cage structure making the overall structure more resistant to impact force.

Figure 13:
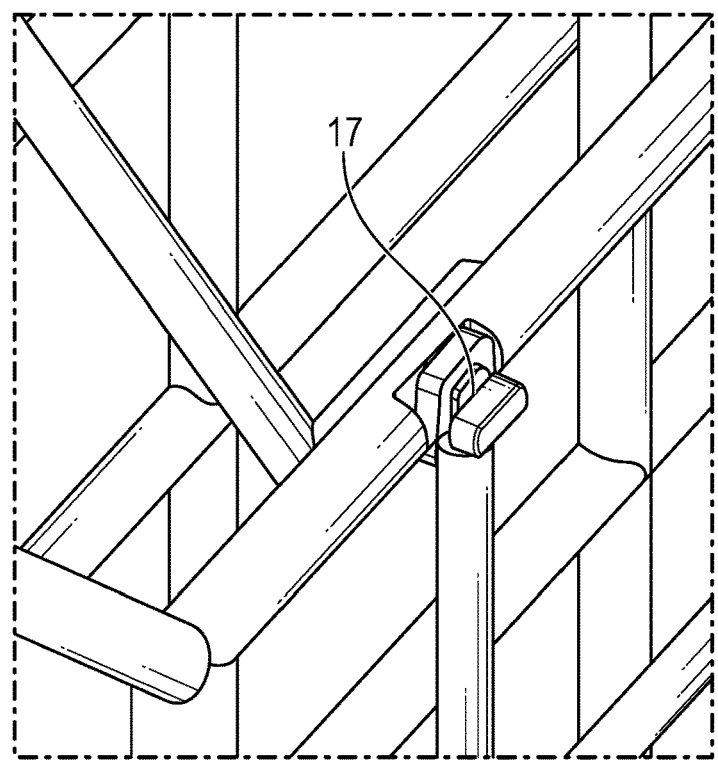
FIG. 13: is an isolated view of a gate catch in one embodiment thereof.

As further shown in FIG. 12, the internal cage (12) may include a cage gate (13) that may be coupled to a cage wall (15) of the internal cage (12) in a hinged configuration. In this embodiment, the cage gate (13) may be opened to insert the item, or items to be secured within the cage generally. This cage gate may be closed and further secured to one or more cage walls, in this embodiment through a gate catch (17) being shown in FIG. 13. In this embodiment, a cage gate (13) may include an aperture that may be positioned over a twist coupler component and quickly secured into position forming a secured unitary cage configuration. As noted above, this gate catch (17) is merely exemplary and not intended to be limiting on the number and variety of couplers that may be used to secure a cage gate (13).

Referring again to FIG. 12, in this embodiment, the upper leading surface of the cage walls (15) of the internal cage may include one or more gate collars (18). In this embodiment, the extended prongs of a cage gate (13) may be configured to be positioned within a corresponding gate collar (18). In this configuration, the cage gate (13) may be more easily positioned in the correct orientation with respect to the cage walls (15) of the internal cage (12).

While this preferred embodiment shows a single internal cage gate (13), additional embodiments may include a plurality of individual internal compartments that may be formed by variably positioned cage walls (15) and accessible through a plurality of securable cage gates (13). For example, in one preferred embodiment, the internal cage (12) may include a single internal compartment that may be configured to secure, for example a laptop, having a separately securable cage gate (13). Alternative embodiments may include an internal gate (12) having a plurality of fixed, or customizable compartments that may be configured, for example by positioning a plurality of cage walls (15) to form separate internal compartments that may further be customized to fit different sized items, or that may form multiple compartments, that hold a laptop separately from a charger, phone or notebook among other electronic or fragile personal items. In this manner, a user may adjust the size and dimensions of the internal cage (12) to conform to a desired size and/or configuration.

In additional embodiments, the internal cage (12) may be configured to be secured within the internal cavity of the reinforced case (1). For example, in one embodiment the internal cage (12) may be secured to the reinforced case (1) through a quick release coupler, or other quick coupler mechanism that may allow a user to quickly attach or detach the internal cage (12) from the internal cavity of the reinforced case (1).

Figure 10:
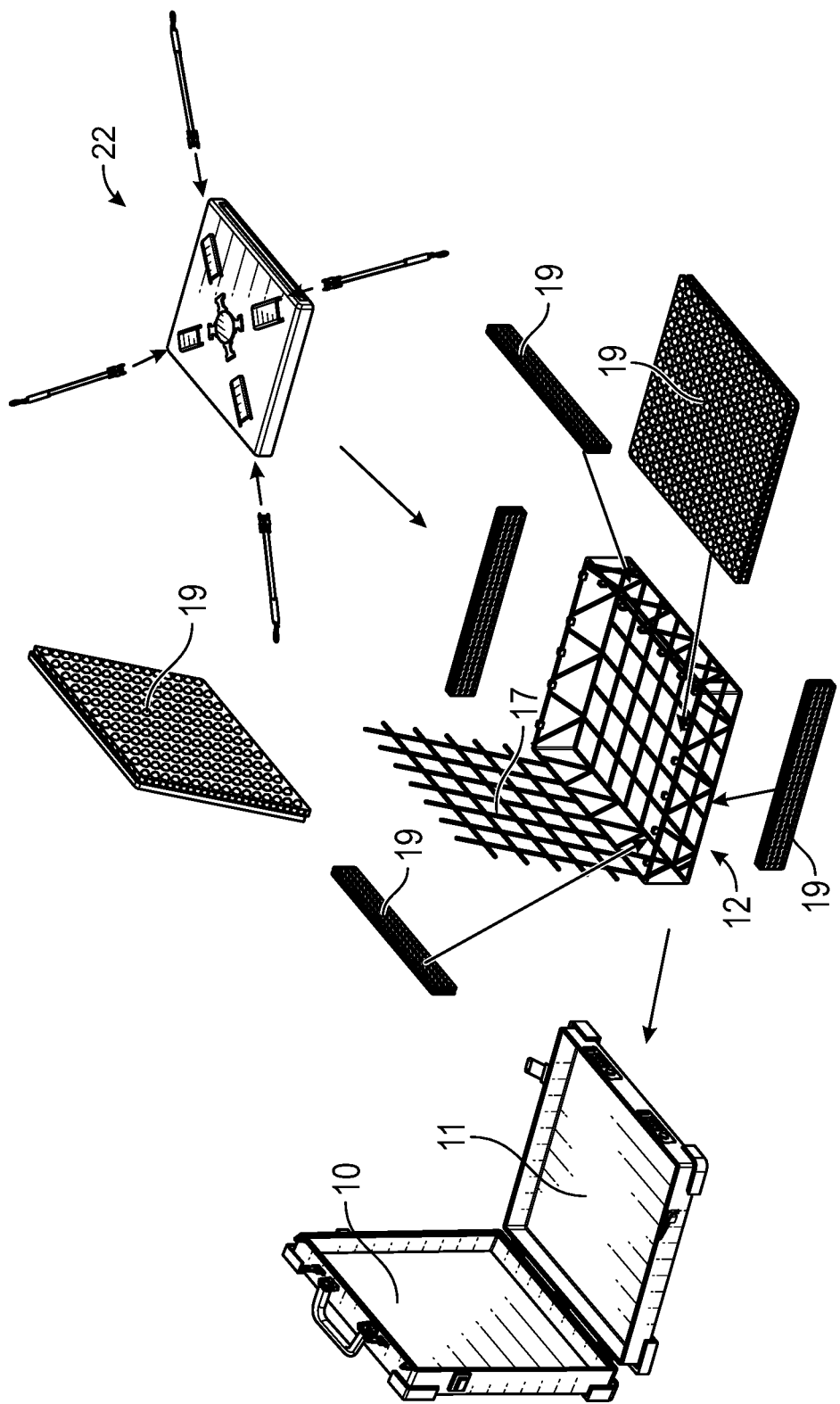
FIG. 10: is a blow-up diagram of a reinforced case having an internal cage coordinated with a shock absorbent surface and a floating chamber system in one embodiment thereof.
Figure 11:
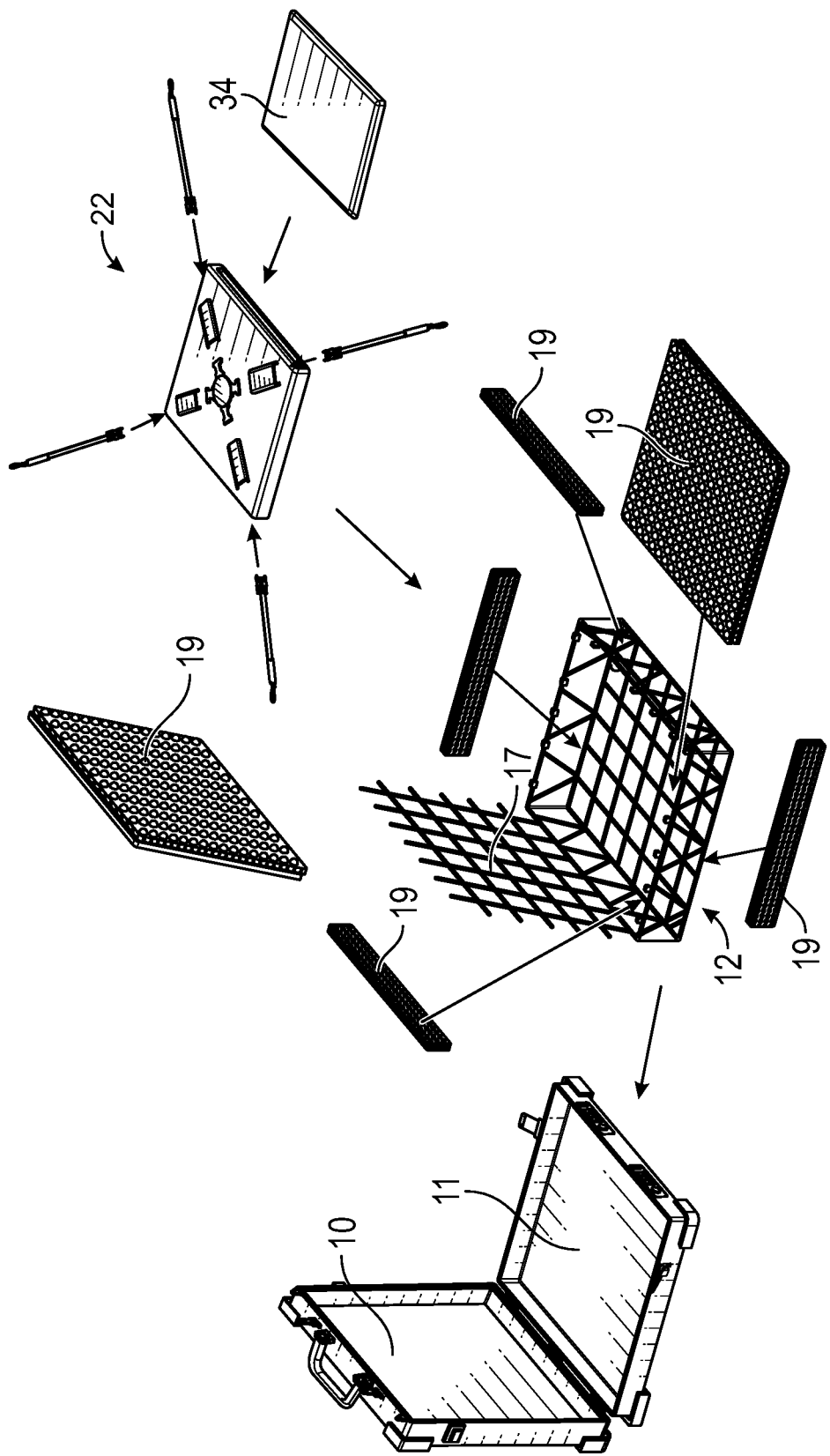
FIG. 11: is a blow-up diagram of a reinforced case having an internal cage coordinated with a shock absorbent surface and a floating chamber system configured to secure a laptop in one embodiment thereof.

The invention may further include one or more shock absorbent surfaces (19). Referring to FIGS. 1, 10, and 11, in one preferred embodiment the invention may include a plurality of modular shock absorbent surfaces (19) that may be secured along the internal surface of the internal cage (12) or other surface. In this preferred embodiment, such shock absorbent surfaces (19) may be formed through the close coordination of a plurality of individual buffer cells (20). As shown in the side profile image of FIG. 8, in this embodiment such buffer cells may form a single or multi-layer surface. Individual buffer cells (20) may be configured to contain a buffer medium, such as a compressible gel or pliable plastic that may allow the buffer cells (20) to individually compress in response to an impact force. In certain embodiments, this buffer medium may include a compressible air chamber among others embodiments. In this manner, the impact force is transmitted into, and dissipated by the collective action of the buffer cells (20) that may comprise a shock absorbent surface (19). In one embodiment, a shock absorbent surface (19) may include a single, or multiple layers of buffer cells (20) that may further be secured in a flexible mesh or other supporting layer. For example, again referring to FIG. 8, in this embodiment a shock absorbent surface (19) may include two opposing layers of coordinated buffer cells (20) coupled through an interface surface (21).

Referring now to FIG. 10, in this embodiment a plurality of shock absorbent surface (19) components may be secured along the internal surfaces of the internal cage (12) forming an buffered internal cavity that may encase a valuable or fragile object, such as a laptop, or piece of art work and the like. In certain embodiments, shock absorbent surface (19) components may be physically coupled with one or more surfaces of the internal cage (12), such as a cage wall (15) or cage gate (13). In one preferred embodiment, the internal cage (12) may be configured such that one or more shock absorbent surface (19) components may slide over the internal surface and be secured by integral slot compartments formed along the internal surface of the internal cage as generally shown in FIG. 1. In this embodiment, such shock absorbent surface (19) components may be removable and interchangeable depending on the desired configuration of the internal cage. In additional embodiments, such shock absorbent surface (19) components may be secured to one or more internal surfaces of the internal cage (12) through an adhesive or other detachable connection, such as Velcro®, or flexible bands and the like.

Generally referring now to FIGS. 1, and 14-16, the invention may include a floating chamber (22). In the preferred embodiment shown in the Figures, a floating chamber (22) may include a reinforced jacket (23). In certain embodiments, this reinforced jacket (23) may be ruggedized to include a durable outer shell made from a material such as hard plastic, Kevlar® or other composite materials like durable carbon-based composites. In additional embodiments, the internal portion of the reinforced jacket (23) may include a buffered surface, for example a pliable material such as foam padding or cloth that may protect any item secured within the reinforced jacket (23) from an impact or other force. In one preferred embodiment, one or more internal surfaces of the reinforced jacket (23) may include a shock absorbent surface (19) comprising a plurality of closely coordinated buffer cells (20) as generally described herein.

Figure 14:
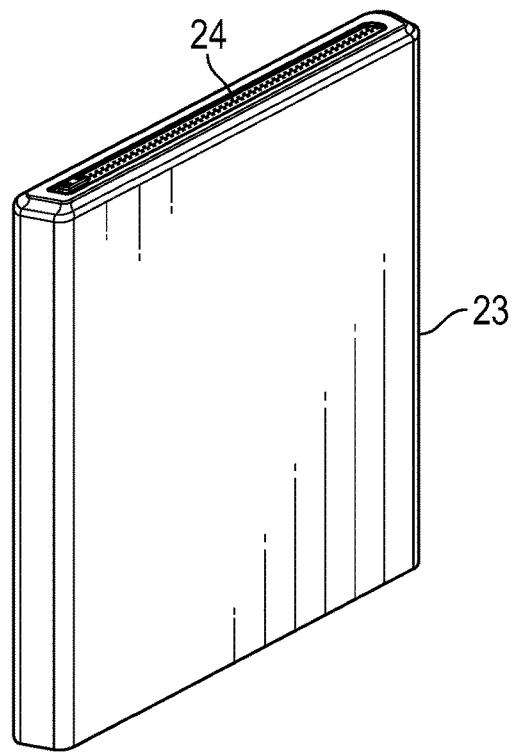
FIG. 14: is a perspective view of a reinforced jacket in one embodiment thereof.

The reinforced jacket (23) may be configured to fit within the internal cage (12), which may preferably include a plurality of shock absorbent surface (19) components secured to one or more internal surfaces of the internal cage (12). As also shown in FIGS. 11 and 14, the reinforced jacket (23) may further include a jacket aperture (24), shown here as an exemplary zipper-actuated aperture which may be opened to insert a desired item, such as a laptop (34), and subsequently closed to secure said item. Multiple jacket aperture (24) components may be used instead of the exemplary zipper as shown in the Figures. Such embodiments may include a snap, a slide, or a quick-release coupler among others.

In another preferred embodiment, the invention's reinforced jacket (23) may further include a jacket adapter (25).

Figure 15:
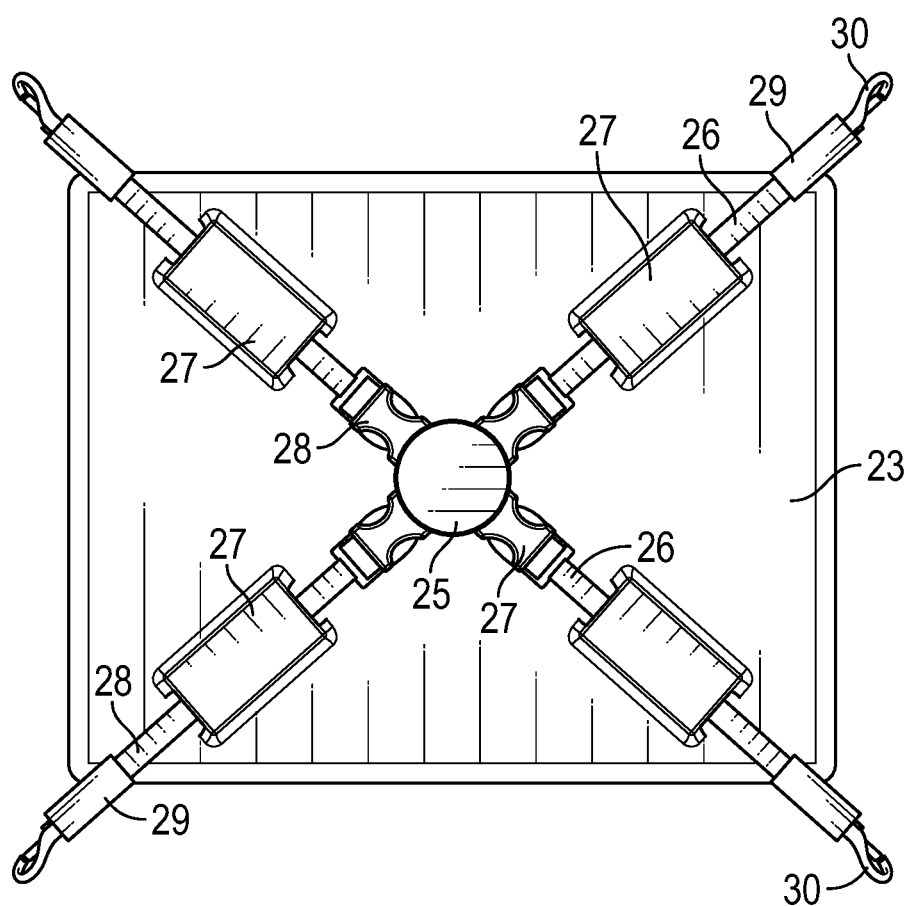
FIG. 15: is a floating chamber system in one embodiment thereof.
Figure 16:
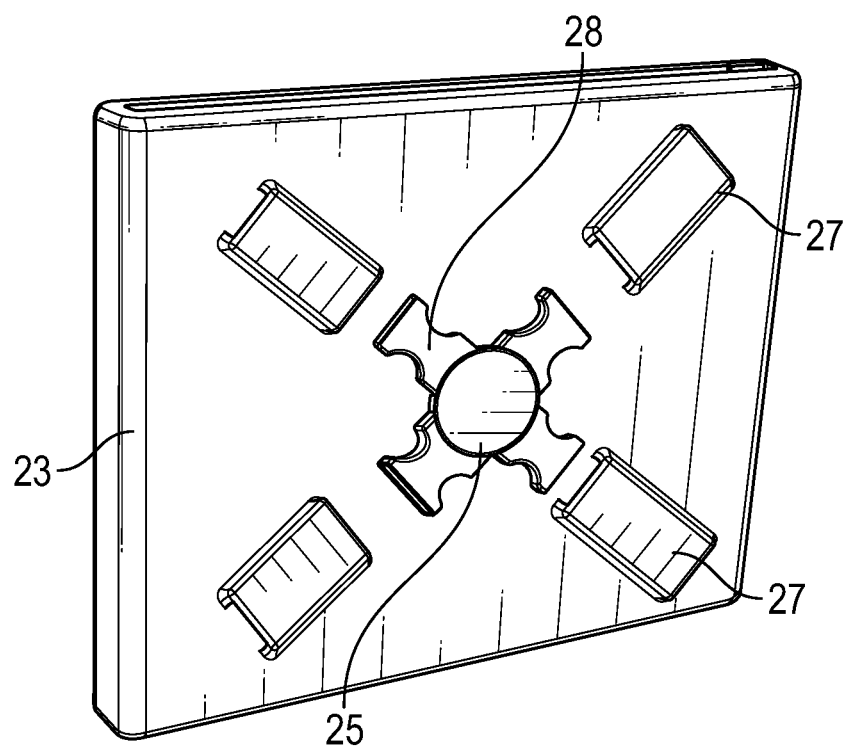
FIG. 16: is a perspective view of a floating chamber system having a plurality of jacket interfaces in one embodiment thereof.

Referring to FIGS. 15-16, in this embodiment a jacket adapter (25) may be positioned centrally along the surface of a reinforced jacket (23) forming a central hub, or securement point. In this embodiment, the jacket adapter (25) may be integral with, or transiently coupled with the reinforced jacket (23) through one or more coupler elements. In one preferred embodiment, a jacket adapter (25) may be secured to a reinforced jacket (23) through a twist coupler, a slide coupler, a beveled coupler, and a snap coupler and the like.

Again referring to FIGS. 10-11, and 15, a reinforced jacket (23) may include a plurality of jacket interface (27) components. In the preferred embodiment shown in the Figures, such jacket interface (27) components may include extended apertures that are integrally formed with, or coupled to the reinforced jacket (23). As specifically shown in FIG. 15, a tractable support (26), which in this embodiment is shown as a flexible band, may be positioned inside the jacket interface (27). Such tractable support (26) components may include a jacket coupler (28) at its terminal end. In this embodiment, the jacket coupler (28) positioned at the terminal end of a tractable support (26) may be coupled with a centrally positioned jacket adapter (25). The other terminal end of the tractable support (26) may include a quick release coupler (30) that may extend outward and be configured to be coupled to an internal position within the internal cage (12) or reinforced case (1). In this configuration, the tractable support (26) may be easily decoupled and the reinforced jacket (23) removed. Alternatively, the tractable support (25) may be quickly coupled to the jacket adapter (25) and/or internal catch (31) and secured within the internal cage in this preferred embodiment. It should be noted, that the number and placement and configuration of the jacket adapter (25), internal catches (31) and jacket apertures (24) may vary depending on the item to be secure among other considerations.

As highlighted in FIGS. 11 and 12, a device or object, such as a laptop (34), may be inserted into the reinforced jacket (23) through a jacket aperture (24) which may be subsequently closed securing the item to be protected. Next, a plurality or tractable supports (26) may be coupled with, in this embodiment, a corresponding internal catch (31) positioned at the corners on the internal cage (12). In an alternative embodiment, a plurality or tractable supports (26) may be coupled with, in this embodiment, a corresponding internal catch (31) positioned at the corners on the reinforced case (1). In this embodiment, such internal catches (31) may be retractable and or configured to form a meshed connection with the internal cage (12). In this configuration, a floating chamber (22) may be formed without the internal cage (12).

These tractable supports (26) may be threaded through a jacket interface (27) and then coupled with a corresponding jacket adaptor (25*a*) In this configuration, the reinforced jacket (23) may be converted into a floating chamber where the tractable supports (26) allow the reinforced jacket (23) to be secured in a suspended, or floating position within the internal cage (12) or the reinforced case (1) in another embodiment. As a result of this floating chamber configuration, the tractable supports (27) may provide a recoiling impact absorption system that may more effectively distribute impact forces applied to the reinforced case (1), while providing a physical buffering system to protect the item secured within the reinforced case (1).

Figure 17:
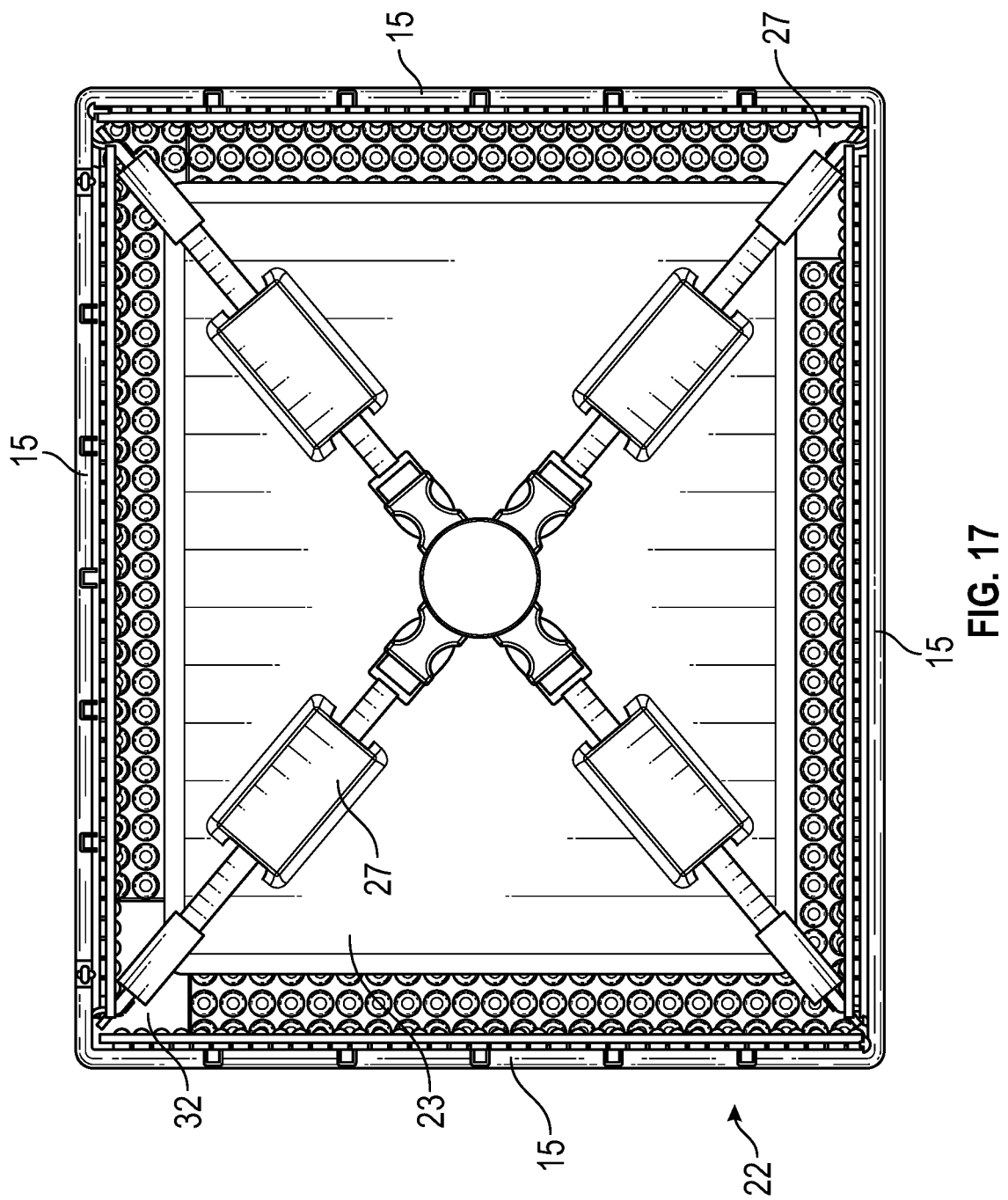
FIG. 17: is a cross-sectional view of an integrated GPS processor and power system in one embodiment thereof.

In another preferred embodiment, the invention may include additional data protection elements. For example, referring to FIG. 17, in one embodiment the invention may include a data security system that may allow a user to protect data, for example stored on a laptop, against unauthorized access. In this preferred embodiment, a data deletion system and method may detect unauthorized access into the reinforced case (1), for example through a GPS system (32), powered by a power source, which may be in communication with a processer capable of sending a signal. In this embodiment, unauthorized access into the reinforced case (1), internal cage (12), or reinforced jacket (23), may be detected by a GPS system that may then send a signal to a processor. The processor may send a signal to, in this embodiment a secured laptop having a computer executable program configured to receive a signal from the processor in the event of an unauthorized access. This processor signal may circumvent and/or activate the computer's internal basic input/output system (BIOS), and thereby activate the computer if it is in an off, or sleep mode. This processor signal may activate a data deletion routine, such as a data delete command from a storage management system such as an operating system or other software application. The system and method provides a system invoked deletion process that modifies the desired data to be deleted in response to the detected data deletion single from the processor. The disclosed invention does not require continued user invocation to select data to be deleted. In addition, the disclosed system and method may be employed as part of an operating system, or as a stand-alone deletion engine that can be integrated into existing operating systems. Modification of the desired data to be deleted includes actual deletion of the information by overwriting the desired data to be deleted with random data or other process such as overwriting original data multiple times to ensure that there is no detectable electronic signature of the original data.

In an alternative embodiment, the deletion of data due to an unauthorized access of the reinforced case (1) or jacket (23) may include encrypting the desired data to be deleted, overwriting the desired data to be deleted, and then storing the encrypted data for later recovery using public key encryption/decryption techniques or other suitable encryption/decryption techniques. Also, if desired the system provides a selectable deletion application mechanism which may apply the deletion process to a specific group of files, directories or other data category as determined by the centralized authority or by a user, if desired.

Naturally, all embodiments discussed herein are merely illustrative and should not be construed to limit the scope of the inventive technology consistent with the broader inventive principles disclosed. As may be easily understood from the foregoing, the basic concepts of the present inventive technology may be embodied in a variety of ways. It generally involves apparatus, systems, methods, and techniques as well as devices to accomplish an integrated modular reinforced case with a floating protective chamber. In this application, the improved techniques, including novel and unique methods and apparatus for an integrated modular reinforced case with a floating protective chamber and the like are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the inventive technology and may not explicitly show how each feature or element can actually be representative of a broader function or of a great variety of alternative or equivalent elements. Again, these are implicitly included in this disclosure. Where the inventive technology is described in device-oriented terminology, each element of the device implicitly performs a function. Apparatus claims may not only be included for the device described, but also method or process claims may be included to address the functions the inventive technology and each element performs. Neither the description nor the terminology is intended to limit the scope of the claims that will be included in any subsequent patent application.

It should also be understood that a variety of changes may be made without departing from the essence of the inventive technology. Such changes are also implicitly included in the description. They still fall within the scope of this inventive technology. A broad disclosure encompassing the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the inventive technology both independently and as an overall system.

Further, each of the various elements of the inventive technology and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the inventive technology, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this inventive technology is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "coupler" should be understood to encompass disclosure of the act of "coupling"—whether explicitly discussed or not—and, conversely, were there effectively disclosure of the act of "coupling", such a disclosure should be understood to encompass disclosure of a "coupling method and/or technique, and or device." Such changes and alternative terms are to be understood to be explicitly included in the description.

Thus, the applicant(s) should be understood to have support to claim and make a statement of invention to at least: i) each of the methods, improvements and/or devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) the various combinations and permutations of each of the elements disclosed, xii) each potentially dependent claim or concept as a dependency on each and every one of the independent claims or concepts presented, and xiii) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim v. Cannon Avent Group*, PLC, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. The use of the phrase, "or any other claim" is used to provide support for any claim to be dependent on any other claim, such as another dependent claim, another independent claim, a previously listed claim, a subsequently listed claim, and the like.

Finally, any claims set forth at any time are hereby incorporated by reference as part of this description of the inventive technology, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. An integrated modular reinforced case comprising:
    an outer shell composed of an upper outer shell coupled with a lower outer shell forming an upper and lower chamber of said integrated modular reinforced case;
    a modular internal cage configured to be nested within said upper and lower chamber of said integrated modular reinforced case;
    one or more shock absorbent surfaces configured to be secured to an internal surface of said modular internal cage forming a buffered internal cavity;
    at least one cage gate configured to allow access an internal portion of said modular internal cage;
    a floating chamber further comprising:
        a reinforced jacket configured to be positioned within said modular internal cage and secure a laptop or other fragile or valuable object, said reinforced jacket further including;
        a jacket adapter positioned centrally on an underside of said reinforced jacket coupled with a plurality of tractable supports configured to secure the reinforced jacket in a suspended position within the modular internal cage; and
        at least four jacket interfaces integral to said reinforced jacket wherein each is positioned between an outer surface of said jacket adapter and a corner and forming an integral channel securing one or more of said tractable supports along the underside of said reinforced jacket;
        a jacket coupler secured to a terminal end of each of said plurality of tractable supports and configured to be secured to said modular internal cage, or said outer shell, or an internal catch.

2. A modular reinforced carrying case having a floating chamber comprising:
    an outer shell composed of an upper outer shell coupled with a lower outer shell forming an upper and lower chamber of said modular reinforced carrying case;
    a floating chamber further comprising:
        a reinforced jacket configured to be positioned within said upper and lower chamber of said modular reinforced carrying case and secure a laptop or other fragile or valuable object;
        wherein said reinforced jacket further includes:
            a jacket adapter positioned centrally on an underside of said reinforced jacket coupled with a plurality of tractable supports configured to secure the reinforced jacket in a suspended position within a modular internal cage;
            at least four jacket interfaces integral to said reinforced jacket wherein each is positioned between an outer surface of said jacket adapter and a corner and forming an integral channel securing one or more of said tractable supports along the underside of said reinforced jacket; and
        a jacket coupler secured to a terminal end of each of said plurality of tractable supports and configured to be secured to an internal surface of said outer shell, or an internal catch.

3. The carrying case of claim 2 and further comprising one or more reinforced panels configured to buttress said outer shell.

4. The carrying case of claim 2 and further comprising one or more reinforcing surface inserts configured to ruggedize said outer shell.

5. The carrying case of claim 2 wherein said upper outer shell and said lower outer shell are coupled by a reinforced hinge.

6. The carrying case of claim 2 and further comprising one or more shock absorbent surfaces configured to be secured to the internal surface of said upper and lower chamber of said reinforced case forming a buffered internal cavity.

7. The carrying case of claim 6 wherein said one or more shock absorbent surfaces comprises a plurality of modular shock absorbent surfaces having a plurality of buffer cells.

8. The carrying case of claim 2 and further comprising a shell fastener configured to secure said upper outer shell coupled with said lower outer shell.

9. The carrying case of claim 2 and further comprising a plurality of reinforced corner protectors.

10. The carrying case of claim 2 and further comprising an internally positioned power source.

11. The carrying case of claim 10 and further comprising an internally positioned GPS system operably linked to said power source.

12. The carrying case of claim 11 wherein said GPS system operably linked to said power source is configured to be operably linked with a laptop and further configured to engage a data deletion signal directed to said laptop upon unauthorized access of the reinforced case.

* * * * *